United States Patent [19]
Holt et al.

[11] 3,888,516
[45] June 10, 1975

[54] TOW BAR

[76] Inventors: Lirel G. Holt, 4721 Virginia, Kansas City, Mo. 64110; Max B. Holt, 7528 E. 83rd St., Kansas City, Mo. 64138

[22] Filed: May 24, 1974

[21] Appl. No.: 473,196

[52] U.S. Cl............................................ 280/491 E
[51] Int. Cl............................................ B60d 1/14
[58] Field of Search ........ 280/491 R, 491 A, 491 B, 280/491 C, 491 D, 491 E, 482, 495, 502, 402; 214/86 A

[56] References Cited
UNITED STATES PATENTS

| | | | |
|---|---|---|---|
| 2,507,265 | 5/1950 | Patton | 280/502 X |
| 2,858,145 | 10/1958 | Wilson | 280/495 X |
| 3,200,972 | 8/1965 | Venture | 214/86 A |
| 3,462,173 | 8/1969 | Bock | 280/482 |
| 3,510,146 | 5/1970 | Hartman | 280/491 E |
| 3,649,049 | 3/1972 | Woodke | 280/491 E X |

*Primary Examiner*—Philip Goodman
*Assistant Examiner*—R. Schrecengost
*Attorney, Agent, or Firm*—Lowe, Kokjer, Kircher, Wharton & Bowman

[57] ABSTRACT

A tow bar for vehicles which eliminates the need for special clamps is provided by the present invention. An elongated towing member is adjustable in length to accommodate different vehicles. This towing member may also be partially collapsed to reduce its overall length for transport and storage purposes. A cross tie is rigid with the towing member and extends transversely thereof for coupling with the towed vehicle. At least two chain means are adapted to be coupled with the cross tie by bolt means or the like for coupling the cross tie to the towed vehicle. Each chain means is adapted to be releasably secured to the cross tie at two locations along its length with the intermediate stretch of chain passing over a portion of the vehicle. Appropriate hitch means is also coupled with the towing member for coupling with a towing vehicle.

5 Claims, 4 Drawing Figures

PATENTED JUN 10 1975 3,888,516

TOW BAR

This invention relates to towing devices generally and, more particularly, to a tow bar for automotive vehicles.

It is common practice to tow one vehicle by use of another vehicle through utilization of a rigid tow bar. This has the advantage of being less expensive than a winch which would lift the towed vehicle off the ground and permits towing by a standard automotive vehicle. The major disadvantage to even more widespread usage of tow bars has been the need to have a special bracket arrangement for different models of autos. While many satisfactory tow bars have existed in the prior art, they could accommodate only one or two models of automobiles and were not versatile enough to be used on many different models.

It is therefore an object of the present invention to provide a tow bar structure which is nearly universal in being able to accommodate different models of cars without need to modify the tow bar from one model to the next.

As a corollary to the above object, an important aim of the invention is to provide a tow bar which is adapted to be coupled with a vehicle at a number of different locations thus having greater versatility than prior art tow bars.

An objective of the invention is also to provide a tow bar which is foldable for purposes of transporting and storage.

Still another aim of the invention is to provide a tow bar which is adjustable in length so as to always provide for maximum strength for the particular hook up utilized.

It is still another one of the objects of our invention to provide a tow bar which may be constructed from readily available standard bar stock thus making it economically feasible.

It is also an important aim of this invention to provide a tow bar constructed according to the objectives above set forth wherein it is possible to minimize the number of welds required in the construction without sacrificing strength.

Other objects of the invention will be made clear or become apparent from the following description and claims when read in light of the accompanying drawing wherein:

Figure 1:
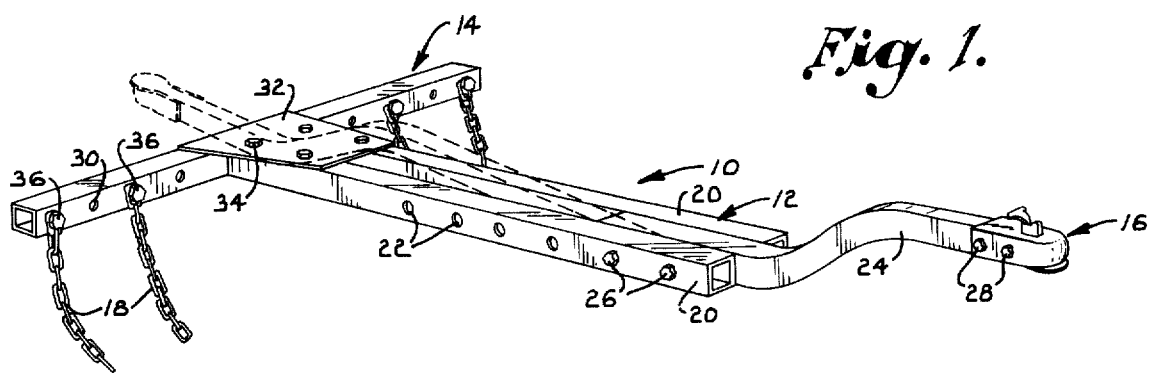
FIG. 1 is a perspective view of a tow bar constructed according to the teachings of the present invention.

Referring initially to FIG. 1 of the drawing, the tow bar is designated generally by the numeral 10 and comprises an elongated towing member designated generally by the numeral 12, a cross tie 14 and a socket type hitch attachment designated generally by the numeral 16. A plurality of chains 18 are coupled with cross tie 14 as will be more fully explained hereinafter.

Towing member 12 comprises two spaced apart longitudinally extending arms 20 formed from square hollow bar stock. Each of arms 20 has a plurality of openings 22 disposed in spaced apart relationship along its length and aligned with corresponding openings in the adjacent bar. Member 12 is completed by a generally S-shaped third arm 24, one end of which is received between arms 20. Third arm 24 is also constructed of hollow square bar stock bent to give it the generally S-shaped configuration. One end of arm 24 is provided with two spaced apart openings (not shown) which are positioned for alignment with any two of the sets of openings 22. When the openings in arm 24 are aligned with appropriate openings 22, bolt means 26 are inserted to secure the arms together.

At the opposite end of arm 24 hitch means 16 is telescoped onto the arm and is secured by nut and bolt means 28. As will be appreciated by those skilled in the art, hitch means 16 is of a well known type providing a socket for a ball hitch (not shown).

Cross tie 14, like arms 20 and 24, is constructed of hollow square bar stock and is provided with a plurality of openings 30 along its length in spaced apart relationship. A flat pressure plate 32 is welded or otherwise rigidly secured to cross tie 14 and projects laterally from one side of the latter at a right angle. Pressure plate 32 is provided with multiple openings positioned for alignment with corresponding openings in arms 20 so that the aligned openings can receive nut and bolt means 34. Thus, nut and bolt means 34 secure arms 20 to the pressure plate 32.

Coupling chains 18 are secured to cross tie 14 by nut and bolt means 36 which are simply passed through one link of the chain.

Figure 2:
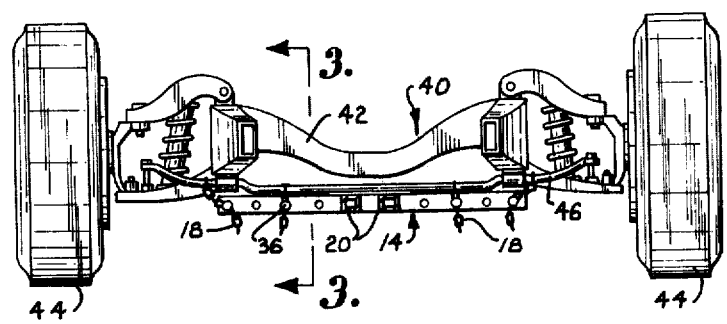
FIG. 2 is a front elevational view, partially in cross section, showing the tow bar secured to the front end of an automobile chassis.
Figure 4:
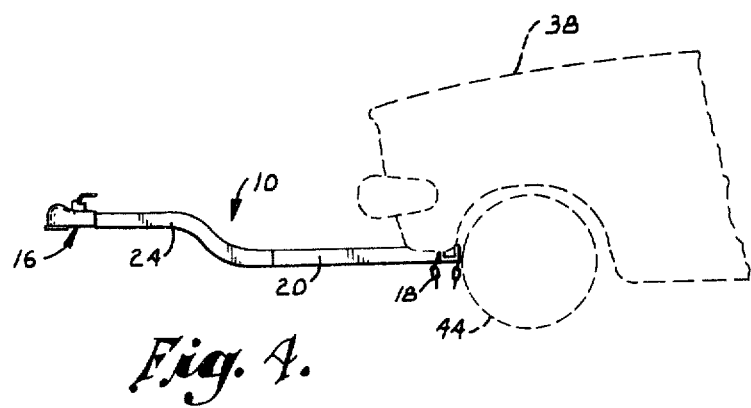
FIG. 4 is a diagrammatic side elevational view illustrating the towing position of the structure of the invention.

Tow bar 10 is adapted to be positioned under the front of a vehicle such as 38 (FIG. 4) for the purpose of towing the vehicle. In FIG. 2, a typical wheel and axle assembly is illustrated on a somewhat enlarged scale and designated generally by the numeral 40. Assembly 40 includes an axle 42, wheels 44 and stabilizing bar 46.

Figure 3:
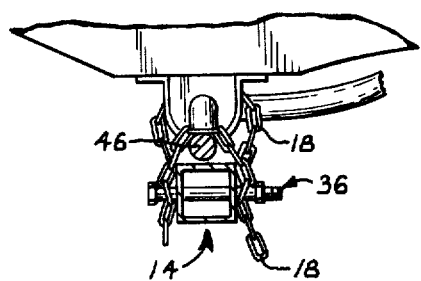
FIG. 3 is a cross-sectional view taken along line 3–3 of FIG. 2.

It is desirable to secure tow bar 10 to stabilizer bar 46 for purposes of towing vehicle 38 in the manner illustrated in FIGS. 2 and 3. First of all, chains 18 are passed over bar 46 in the locations illustrated in the drawing. The chains 18 are pulled tight and an appropriate link is aligned with one of the openings 30 so that the projecting end of bolt 36 can pass through the link. This is done for each of the chains 18 to bring cross tie 14 up tight against stabilizing bar 46. In this manner, each of chains 18 is coupled with the bolt means 36 and cross tie 14 at two spaced apart locations with the stretch of the chain intermediate the two locations passing over stabilizing bar 46. Manifestly, it may be desirable to provide different lengths of chain 18 for positioning the chains in the locations indicated.

While it is normally adequate to provide only two chains for securing cross tie 14 to a portion of the vehicle being towed, four chains are desirable in some cases so as to preclude any possibility of lateral movement. Thus in the arrangement illustrated in FIGS. 2 and 3, the outermost chains 18 serve primarily to preclude any lateral movement of the tow bar while the two inside chains are the primary load carrying coupling between the tow bar and the vehicle. While a chain is the preferred type of flexible fastening means, it is possible to utilize a cable or other equivalent fastening means to secure the cross tie 14 to the vehicle.

The different locations for openings 30 along the length of cross tie 14 permit chains 18 to be coupled with the cross tie at various locations to accommodate different types of hook ups for different vehicles and different situations. Chains 18 are normally of a length such that the actual effective length of the chain can be varied considerably, further adding versatility to the tow bar. A particular advantage of the construction of tow bar 10 is the utilization of pressure plate 32 for coupling arms 20 with cross tie 14. By removing bolt and nut assemblies 34, the arms 20 are released from the cross tie and by removing one of the nut and bolt means 26, arm 24 may be folded back into the position shown in broken lines in FIG. 1. Thus, the entire tow bar 10 may be easily transported or stored in the trunk of an automobile vehicle. Although it is preferable to weld pressure plate 32 to cross tie 14, it is possible to utilize nut and bolt assemblies to secure this plate to the cross tie thus completely eliminating the need for welds in constructing tow bar 10. Pressure plate 32 is highly effective in distributing forces encountered on the tow bar over the maximum possible area thus adding considerable strength to the tow bar.

The fact that openings 22 accommodate nut and bolt assemblies 26 in a number of positions allows the overall length of the tow bar to be changed for different hook ups of different vehicles. Thus, the length is always minimized so as to assure maximum strength of the tow bar when pulling a vehicle. The S-shaped configuration of arm 24 serves to place hitch means 16 at an optimum level for coupling with a hitch ball. In some cases, however, it may be possible to eliminate the curve in arm 24 and utilize straight bar stock for the third arm.

While the tow bar of the present invention is particularly adapted for towing small, foreign and compact cars, by utilizing heaver material, a tow bar may be constructed for towing full-size and even heavy luxury automobiles utilizing the teachings of the present invention.

The invention has been described with particular reference to a hook up utilizing the stabilizer bar which runs generally parallel to the front axle on many vehicles. It is to be emphasized, however, that the tow bar of the present invention is in no way limited to this particular hook up and in some instances it may be desirable to connect the tow bar with the axle itself or with a portion of the frame. An almost unlimited number of possible variations is possible utilizing the tow bar of the present invention. This eliminates the need for special clamps or adjustments in the tow bar to accommodate different vehicles.

Having thus described the invention, we claim:

1. A collapsible tow bar for coupling the front of a towed vehicle with the rear of a towing vehicle comprising:
    first and second spaced apart elongated arms adapted to extend from the rear of said towing vehicle to the front of said towed vehicle and each having a plurality of aligned openings along its length;
    a third arm received between said first and second arms projecting from one end of said first two arms and having a plurality of openings along its length adapted to be aligned with said openings in said first and second arms;
    removable fastening means for coupling said third arm with said first and second arms in any one of a plurality of positions and accommodating pivotal movement of said third arm between folded and unfolded positions;
    hitch means disposed on said third arm for coupling the latter with the towing vehicle;
    a cross tie extending transversely of said first and second arms and rigidly coupled therewith;
    pressure plate means rigid with said cross tie and said first and second arms for distributing towing forces; and
    flexible fastening means adapted to be coupled with said cross tie in spaced apart locations for securing said cross tie to the towed vehicle.

2. The invention of claim 1, wherein said flexible fastening means comprises chain means adapted to be secured to said cross tie at two locations with a stretch of the chain means intermediate said two locations disposed around a portion of the towed vehicle.

3. The invention of claim 1, wherein said third arm is disposed in a generally S-shaped configuration to facilitate coupling with the towing vehicle.

4. The invention of claim 2, wherein said cross tie is provided with a plurality of spaced apart openings along its length for securing said chain means in different locations; and including coupling means adapted to be received in said openings and coupled with said chain means for securing the cross tie to the towed vehicle.

5. The invention of claim 4, wherein is included additional chain means disposed in spaced relationship to each of the first chain means and adapted to be coupled with said cross tie and said towed vehicle.

* * * * *